| Time Interval | Compound | Concentration |
|---|---|---|
| 1 | B | 1 : 1,000,000 |
| 2 | A | 1 : 100,000 |
| 3 | C | 1 : 100,000 |
| 4 | D | 1 : 100,000 |
| 5 | B | 1 : 1,000,000 |
| 6 | B | 1 : 200,000 |
| 7 | B | 1 : 100,000 |
| 8 | A | 1 : 100,000 |

INVENTORS
Rudolf Hiltmann
Wolfgang Wirth
BY Fritz Mietzsch

United States Patent Office 3,095,449
Patented June 25, 1963

3,095,449
1-(GAMMA-DIMETHYLAMINOPROPOXY)-2-ALKOXY ALKENYLBENZENES
Wolfgang Wirth, Rudolf Hiltmann, and Fritz Mietzsch, Wuppertal-Elberfeld, Germany, assignors, by mesne assignments, to Farbenfabriken Bayer Aktiengesellschaft, a corporation of Germany
Filed Aug. 6, 1957, Ser. No. 676,570
3 Claims. (Cl. 260—570.7)

This invention relates, in general, to novel organic chemical compounds. More particularly, the invention contemplates the provision of certain novel derivatives of gamma-dimethylaminopropoxy benzenes which are found to possess pharmacological activity as central nervous system depressants within warm-blooded animals.

It has been established, heretofore, that certain dialkylaminoalkyl ethers of 2-alkoxy-6-allyl-phenols other than the dimethylaminopropyl ether of such phenols, and notably the diethylaminoethyl ether of 2-methoxy-6-allyl-phenol (Gravitol: trade name—Germany, infra) exhibit uterostypic action in the treatment of uterine disturbances such as post-partum haemorrhages, haemorrhages due to abortion and post-partum uterine atonia, atonic and inflammatory haemorrhages of the uterus (menorrhagias, metrorrhagias), haemorrhages during puberty and climacteric, etc. It has not previously been suggested, however, to use compounds of this type in the treatment of neurosis and of other mental disorders.

The present invention is based, in part, on our discovery that the novel gamma-dimethylaminopropoxy derivatives of the general class described exhibit a depressant effect upon the central nervous system of warm-blooded animals similar to that of chlorpromazine, i.e. 3-chloro-10-(gamma-dimethylaminopropyl)-phenothiazine, but are generally superior to chlorpromazine, in that, they are without the peripheral adrenolytic activity and potentiating effect of the latter compound, and are generally more tolerable. In electroencephalogramatic studies, the compounds of the invention show specific utility in the treatment of neurosis and of certain mental disorders.

The novel compounds of the invention may be represented in general by the following structural formula:

(I) 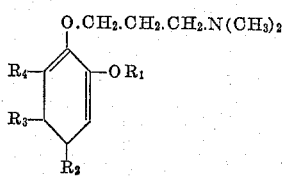

wherein $R_1$ represents a member selected from the group consisting of lower alkyl and monocyclic aralkyl radicals; and $R_2$, $R_3$ and $R_4$ are members selected from the group consisting of alkenyl radicals and hydrogen, wherein two of the three substituents $R_2$, $R_3$ and $R_4$ are hydrogen. Among the $R_1$ substituent groups which are found to be particularly effective are methyl, ethyl, n-propyl, isopropyl, and benzyl. Among the alkenyl substituents are included allyl, propenyl, methallyl, and crotyl.

The novel gamma-dimethylaminopropoxybenzene derivatives defined above may be produced by several different syntheses. Thus, they may be produced by introducing the gamma-dimethylaminopropyl radical, by known techniques, into 1-hydroxy-2-alkoxy- or 1-hydroxy-2-aralkoxybenzenes, which also carry an unsaturated, possibly halogenated, hydrocarbon radical in the 4-, 5- or 6-position of the benzene ring. To this end, correspondingly substituted hydroxybenzenes may be reacted with reactive esters of gamma-dimethylaminopropanol, i.e., with its hydrohalic or alkylsulfonic or arylsulfonic esters, possibly in the presence of acid acceptors such as alkali hydroxides or alkali alcoholates.

Another suitable synthesis involves introduction of the gamma-dimethylaminopropyl radical in stages. For example, the aforementioned hydroxybenzenes may be reacted with reactive esters of propanols that bear a gamma-substituent which is readily convertible into a dimethylamino group, e.g., an hydroxyl group or a protected amino group, or a halogen atom, or a carboxamide group, followed by conversion of this substituent into the desired dimethylamino group. Thus, the hydroxybenzene derivatives may be reacted with gamma-halopropanols, α,γ-dihalopropanes, gamma-halopropyl phthalimides or gamma-halobutyric acid amides, and the gamma-hydroxy group or gamma-halogen atom subsequently exchanged against the dimethylamino group, or the gamma-phthalimido radical saponified into the free amino group and subsequently dimethylated, or the carboxylic acid amide group in the gamma-position degraded by the Hofmann rearrangement technique to an amino group which then may be methylated on the nitrogen by conventional procedures.

A further route of synthesis of the novel compounds of the invention is through reaction of a phenol, selected as above-described, with suitable reactive esters of β-hydroxypropionic acid as, for example, β-chloropropionic acid amide, β-chloropropionic acid dimethylamide, or β-chloropropionitrile, preferably in the presence of acid acceptors, after which the carbonamide or the nitrile group in the β-position to the ether linkage is converted into a dimethylaminomethylene group by standard procedures. In like manner, corresponding acrylic acid derivatives may be reacted with the selected phenols in the presence of suitable catalysts to form analogous intermediates that may be converted to the desired final products by known methods.

Finally, by preparing the gamma-dimethylaminopropyl carbonates from the hydroxybenzene derivatives, followed by decarboxylating these esters, preferably in the presence of a suitable catalyst, one may also obtain the desired end products of the invention.

The novel compounds of the invention, as free bases, are liquids at ordinary room temperature or melt at comparatively low temperatures; they can be distilled readily under vacuum; and they form readily water-soluble, and, for the most part, well-crystalized salts with numerous organic and inorganic acids.

The unique pharmacological activity of the compounds of the invention, as compared with previously known compounds of the same general class, has been demonstrated by a series of comparative experiments in which the following four compounds were utilized:

(A)

(II) 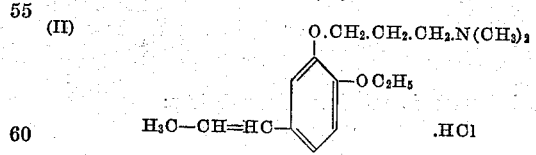

(See Ex. I)

(B)

"Gravitol" (supra):

(III) 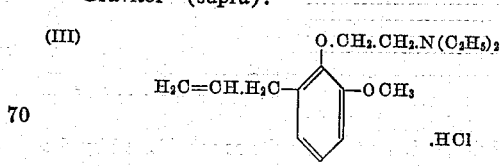

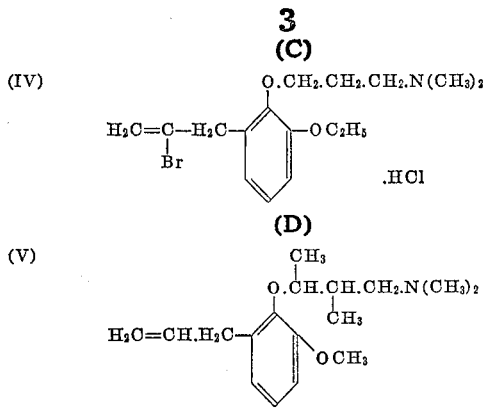

The results of the aforementioned comparative experiments are described below with reference to the accompanying drawings wherein.

(a) TOXICITY

Figure 1:
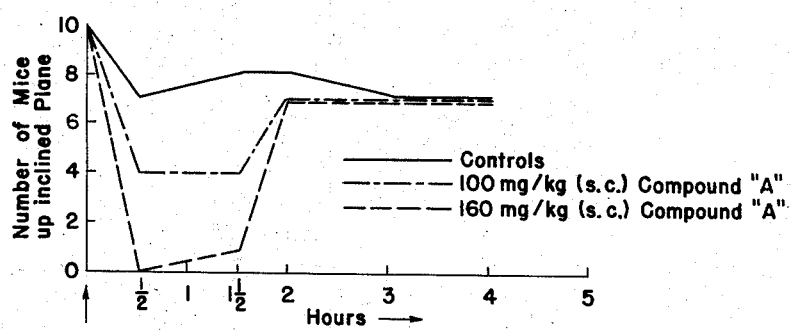
FIGS. 1–4 illustrate, in graph form, results obtained in an inclined plane test conducted with mice for purposes of determining the relative effects of compounds A–D on the central nervous system.
Figure 2:
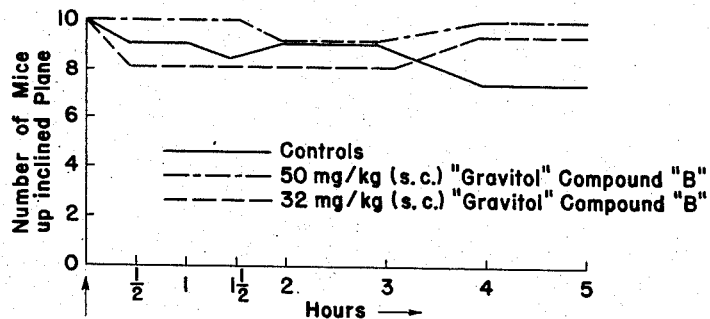
Figure 3:
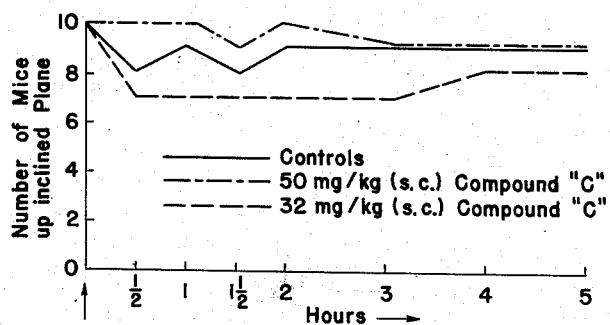
Figure 4:
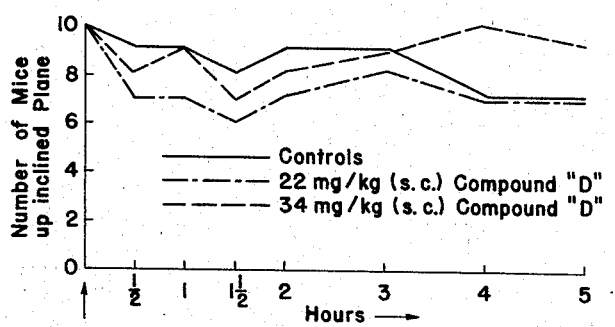

The following tabulated data illustrate the relative toxicity of the four test compounds expressed in $LD_{50}$ (lethal dose causing 50% of the test animals to expire within four days—mg./kg.):

TABLE I

| Compound | Mouse (s.c.) | Mouse (i.v.) | Rat (orally) |
|---|---|---|---|
| A | 400 | 85 | 600 |
| B | 125 | 40 | 150 |
| C | 125 | 35 | 400 |
| D | 85 | 25 | 100 |

(b) EFFECT ON CENTRAL NERVOUS SYSTEM (Inclined Plane Test)

The effects of the four compounds on the central nervous system were investigated by means of an "inclined plane" test which has been devised for the study, in general, of agents acting on the central nervous system. Thus, groups of 10 mice each were placed on the lower end of a canvas-covered board inclined at an angle of about 75°. Untreated animals generally walk to the upper edge of the board within 2 minutes. If the animals are pretreated with a sedative, a smaller number of animals, depending on the dose and potency of the sedative, reach the upper edge of the plane.

In order to maintain comparable experimental conditions in the testing of compounds A, B, C and D, we administered equal proportions of the previously defined $LD_{50}$, viz., 1/4 and 4/10 of this dosage. The actual dosages are indicated in tabulated form below:

TABLE II

| Compound | 1/4 of $LD_{50}$ (Mouse s.c., mg./kg.) | 4/10 of $LD_{50}$ (Mouse s.c., mg./kg.) |
|---|---|---|
| A | 100 | 160 |
| B | 32 | 50 |
| C | 32 | 50 |
| D | 22 | 34 |

The results of the inclined plane test are presented in graphic form in FIGS. 1–4 of the drawing. These reflect the range of dispersion of the results as manifested by the controls. As may be seen by reference to the drawings, the compound of the invention (A) has a definite inhibitory (sedative) effect, whereas the three comparison products (B, C and D) either lack this effect entirely or show only a trace of it.

(c) EFFECT ON CENTRAL NERVOUS SYSTEM (Motility Test)

A motility test was conducted on white mice. The test is a further development of the motility testing according to A. W. Forst (Arch. exp. Path. u. Pharm. 192:257, 1939) performed in our laboratory, in which all movements of the animals are recorded and registered by means of an electronic device. In this test only compounds A, C and D were employed, compound B (Gravitol) being omitted because the specific uterine action of the compound precludes its application to the central nervous system in any case (cf. effect on uterus, subdivision e, infra).

Figure 5:
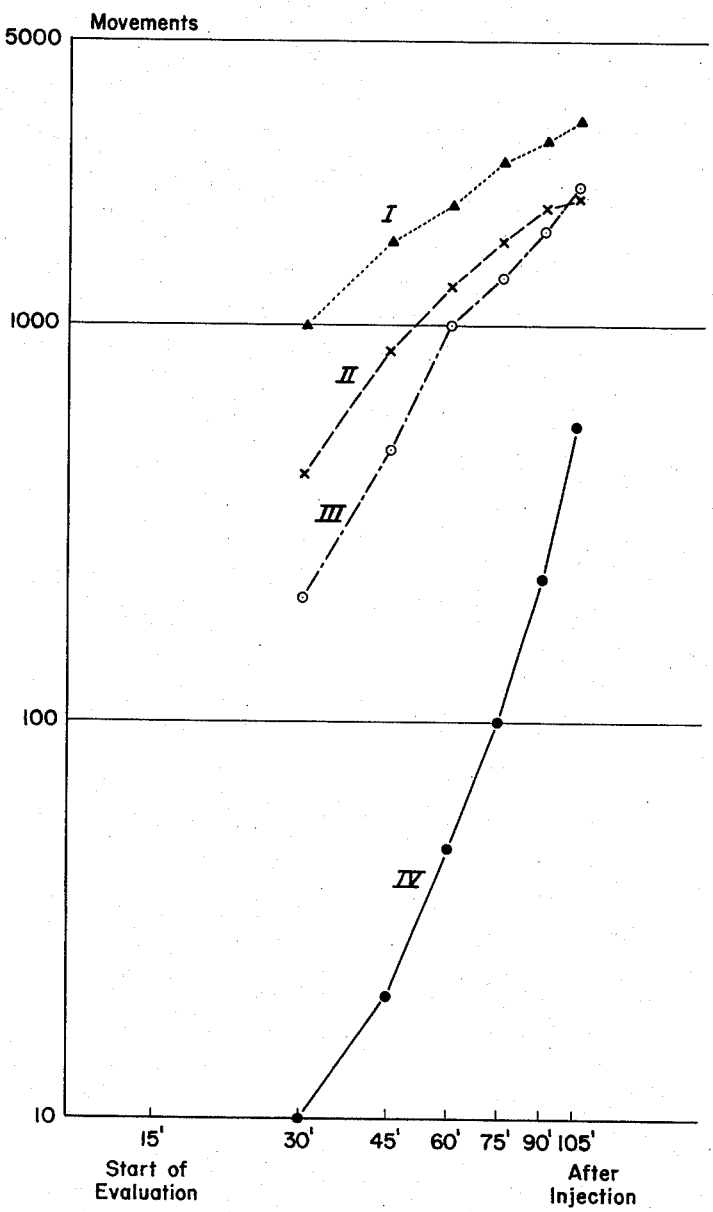
FIG. 5 illustrates, in graph form, results obtained in motility testing of mice treated with a control saline solution, and with compounds A, C and D, respectively.

The results of this test, in which one-fourth of the $LD_{50}$ was employed, are presented in graph form in FIG. 5 of the drawings. With reference to FIG. 5, curve I identifies the control experiment using physiological saline, curve II represents an experiment in which 31.5 mg./kg. of compound C was administered, curve III represents an experiment in which 21 mg./kg. of compound D was administered, and curve IV illustrates the results of an experiment in which the compound of the invention (A) was administered in a dosage level of 100 mg./kg. The respective doses were administered to the mice subcutaneously. The criterion used for comparison was the final value obtained 90 minutes after injection.

The following data represent averages of 10 animals each; the results varied within a range of +10%:

In the control experiment, in which an equivalent volume of physiological sodium chloride solution was injected, about 3200 movements were registered within 90 minutes. Compound A of the invention cut this number down to 630, thus producing an inhibition of approximately eighty percent (80%). Compounds C and D yielded 2200 and 2300 movements, respectively, corresponding to an inhibition of about thirty-two percent (32%) and twenty-nine percent (29%), respectively. It may be seen from the results of this test that the product of the invention is clearly superior in sedative effect.

(d) CLINICAL EFFECT IN ELECTROENCEPHALOGRAM

The sedative action of compound A, as demonstrated initially in animal experiments, was subsequently confirmed clinically by the electroencephalographic method. These studies, in which the brain currents of psychotics were recorded following intravenous injection of the compound (A), revealed an action which was qualitatively equivalent to that of the previously known neurosedative "Megaphen," a substance of the phenothiazine series. It should be noted that the EEG test is today considered to be of outstanding merit for demonstrating sedative effects. Comparative studies on humans were not conducted with compounds B, C and D since these products were too toxic for the purpose.

(e) UTERINE ACTION

As pointed out hereinbefore, the product Gravitol (compound B) used in the foregoing comparative studies is known to have specific uterostypic action. Accordingly, we also investigated the possible uterine action of the compounds of the invention, conducting tests for this purpose with compound A on the isolated rabbit uterus according to the experimental technique of Magnus. The results of these tests are represented in FIG. 6 of the drawings.

Figure 6:
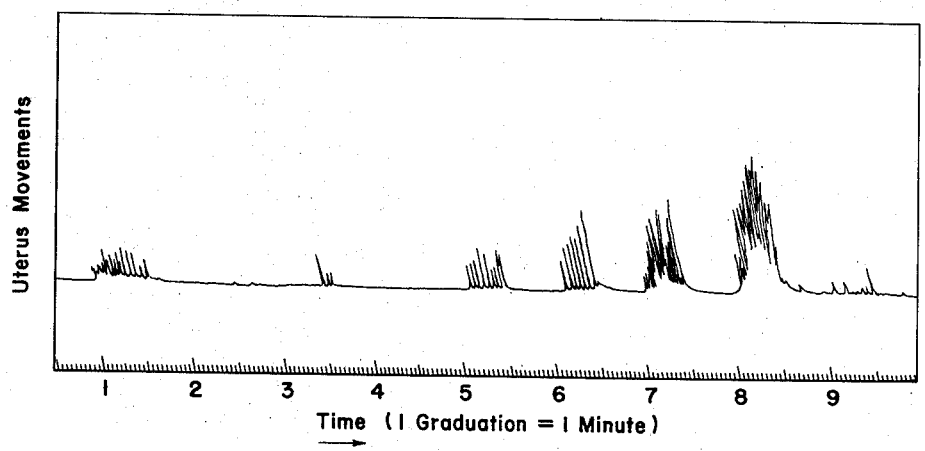
FIG. 6 is a graphic representation of the relative uterine activity of compounds A–D in various concentrations, as obtained in studies on isolated rabbit uterus.

The curve of FIG. 6, which is typical for these studies, shows that even in a 1:1,000,000 dilution Gravitol exercises a distinct uterus-contracting and peristalsis-increasing effect, whereas the compound of the invention used in the tests (compound A), diluted 1:100,000, i.e., in 10 times as high a concentration, shows practically no effect.

Quantitative evaluation on the uterus disclosed that uterine effects similar to that of Gravitol are produced by compound A only when administered in concentrations 100 times higher than Gravitol. Gravitol is therefore unique in this group as far as uterine action is concerned.

To facilitate a fuller and more complete understanding of the subject matter of the invention and of how the novel compounds thereof may be produced, specific procedures for the production of several of the compounds will now be described, but it should be understood that these examples are offered for purposes of illustration, only, and are not to be construed as imposing any limitations on the subjoined claims.

EXAMPLE I

(A)

*Preparation of the Compound 1-(Gamma-Dimethylaminopropoxy)-2-Ethoxy-5-Propenylbenzene, as Represented by the Formula*

(VI)
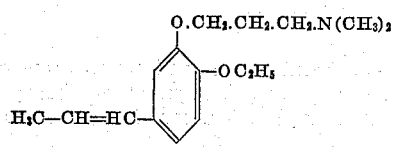

One hundred-fifty (150) grams of 5-propenylpyrocatechol-2-monoethyl ether and 108 grams of dimethylaminopropyl chloride were added to a solution of 19.5 grams of sodium in 500 cubic centimeters of alcohol, and the mixture was boiled under a reflux condenser for twenty (20) hours. The solvent and highly volatile components were then distilled off with steam, and the flask residue was thereafter extracted twice with 200 cubic centimeters of ether. The resulting ether solution was thereafter washed with 100 cubic centimeters of a five percent caustic soda solution and 50 cubic centimeters of water, and subsequently extracted, while cooling, with a mixture prepared from 90 cubic centimeters of pure hydrochloric acid and 200 cubic centimeters of water. The base was precipitated from the hydrochloric acid solution by addition of a fifty percent potassium carbonate solution, absorbed in benzene, and dried with potassium carbonate. Distillation in vacuo following expulsion of the solvent yielded 139 grams of the desired compound in the form of a colorless oil of boiling point (6 mm.) 176–180° C. The hydrochloride has the melting point 166° C.

In analogous fashion, the following compounds were produced by substitution of the respective hydroxybenzenes indicated, for the 5-propenylpyrocatechol-2-monoethyl ether of the foregoing synthesis:

(B)

From eugenol (2-methoxy-1-hydroxy-4-allylbenzene) the compound 1 - (gamma - dimethylaminopropoxy) - 2-methoxy-4-allylbenzene, as represented by the formula:

(VII)
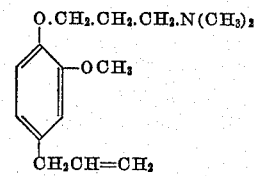

(B.P.$_6$=157–160° C.) (hydrochloride M.P.=98.5° C.)

(C)

From 2-methoxy-5-propenylphenol, the compound 1-(gamma-dimethylaminopropoxy)-2-methoxy-5 - propenylbenzene, as represented by the formula:

(VIII)
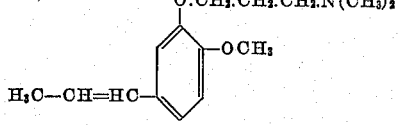

(B.P.$_6$=163–165° C.) (hydrochloride M.P.=166.5° C.)

(D)

From 2-methoxy-6-allylphenol, the compound 1-(gamma-dimethylaminopropoxy)-2-methoxy-6-allylbenzene, as represented by the formula:

(IX)
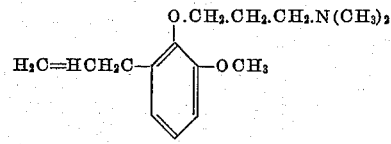

(B.P.$_7$=149–152° C.) (hydrochloride M.P.=156° C.)

(E)

From 2-methoxy-6-propenylphenol, the compound 1-(gamma-dimethylaminopropoxy)-2-methoxy - 6-propenylbenzene, as represented by the formula:

(X)
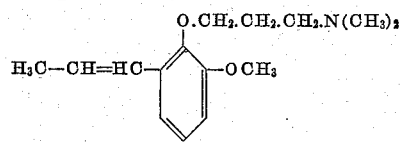

(B.P.$_{5.5}$=149–150° C.) (hydrochloride M.P.=173° C.)

(F)

From isoeugenol, the compound 1-(gamma-dimethylaminopropoxy)-2-methoxy-4-propenylbenzene, as represented by the formula:

(XI)
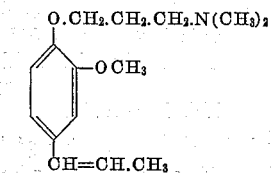

(B.P.$_2$=153–155° C.) (hydrochloride M.P.=127–128° C.)

EXAMPLE II

*Alternate Synthesis for the Preparation of 1-(Gamma-Dimethylaminopropoxy)-2-Methoxy - 5 - Propenylbenzene (Example I–C)*

Twenty (20) grams of 5-propenylpyrocatechol-2-monomethyl ether and 34 grams of gamma-bromopropylphthalimide were added to a solution consisting of 2.9 grams of sodium in 150 cubic centimeters of alcohol. The mixture was boiled under reflux for twelve (12) hours. The solvent was then distilled off under vacuum, and the residue was taken up with ether and washed successively with a ten percent caustic soda solution and thereafter with water. After expulsion of the ether, the residue was redissolved from alcohol, forming the gamma-phthalimidopropyl ether of 2-methoxy-5-propenylphenol as colorless needles of melting point 122–123° C. (yield=12 grams).

Six (6) grams of the phthalimidopropyl ether as obtained above, were refluxed with 5.4 grams of hydrazine hydrate in 40 cubic centimeters of ethanol during 2 hours. The solution was then acidified to pH 6 with dilute acetic acid and evaporated to half its volume. After standing overnight, the precipitated phthalyl hydrazide was separated by vacuum filtration, and the filtrate was evaporated to dryness. The residue was heated on a water bath with 6 grams of formic acid and 5 cubic centimeters of a thirty percent formaldehyde solution for eight (8) hours. Thereafter it was made acid to Congo paper by means of dilute hydrochloric acid, and excess formic acid and formaldehyde were distilled off in vacuo. The residue was taken up with water, and the free base was precipitated by means of sodium hydroxide, and absorbed in ether. After drying the ethereal solution with potassium carbonate, the hydrochloride was precipitated with ethereal hydrochloric acid. There were obtained 3.1 grams of a substance which, upon redissolution in an alcohol-ether mixture, melts at 166.5° C. and is identical with the 1-(gamma-dimethylaminopropoxy) - 2 - methoxy - 5 - propenylbenzene hydrochloride produced in accordance with the technique described in Example I.

EXAMPLE III

*Alternate Synthesis for the Preparation of 1-(Gamma-Dimethylaminopropoxy)-2 - Methoxy - 5 - Propenylbenzene (Example I–C)*

Twenty (20) grams of 5-propenylpyrocatechol-2-monomethyl ether were added to a solution consisting of 2.8 grams of sodium in 200 cubic centimeters of alcohol. This solution was instilled with stirring into a mixture of 100 grams of 1,3-dibromopropane and 150 cubic centimeters of alcohol heated to 60° C., followed by boiling under a reflux condenser for twelve (12) hours. The alcohol and excess 1,3-dibromopropane were then distilled off in vacuo, and the residue was taken up with ether. After separation of the sodium bromide, the ether solution was washed with a ten percent caustic soda solution and water. The residue remaining after expulsion of the ether was distilled in vacuo, and 22 grams of 1-(gamma-bromopropoxy)-2-methoxy-5-propenylbenzene came over at 178–184° C. and 3 mm. pressure. This amount was refluxed with an excess of alcoholic dimethylamine solution during 2 hours, the alcohol was driven off, and the residue was mixed with dilute caustic soda solution. The precipitated base was taken up with ether and dried with potassium carbonate. Following expulsion of the ether, the residue was distilled in vacuo, yielding 15.4 grams of the 1-(gamma-dimethylaminopropoxy)-2-methoxy - 5-propenylbenzene of Example I–C at 159–162° C. and 3 mm. pressure. The hydrochloride has the melting point 166° C.

EXAMPLE IV

*Alternate Synthesis for the Preparation of 1-(Gamma-Dimethylaminopropoxy) - 2 - Methoxy - 5 - Propenylbenzene (Example I–C)*

While cooling with ice, 15 grams of dimethylaniline and a solution of 20 grams of 5-propenylpyrocatechol-2-monomethyl ether in 100 cubic centimeters of benzene were simultaneously instilled into a solution of 15 grams of phosgene in 150 cubic centimeters of benzene. The mixture was then stirred at room temperature for 3 hours, after which the benzene layer was separated. After washing of the benzene with dilute hydrochloric acid, it was dried with calcium chloride and driven off. Vacuum distillation of the residue yielded 24 grams of 2-methoxy-5-propenyl-1-phenylcarbonyl chloride (B.P.$_3$=130–134° C.). This was refluxed with 12 grams of gamma-dimethylaminopropanol in 100 cubic centimeters of toluene during 2 hours. After cooling, the mixture was washed with dilute sodium hydroxide and water, and the toluene was driven off in vacuo, leaving 26.5 grams of gamma-dimethylaminopropyl-2-methoxy-5 - propenyl-1-phenolcarbonate in crystallized form. The hydrochloride of this base melts at 147° C. with decomposition.

The foregoing base, in amount 19.3 grams, was boiled under reflux for 30 minutes and subsequently distilled in vacuo, to yield 15 grams of the desired 1-(gamma-dimethylaminopropoxy) - 2 - methoxy - 5 - propenylbenzene of Example I–C. (B.P.$_3$=160–165° C.; hydrochloride M.P.=165–166° C.).

Having thus described the subject matter of our invention, what it is desired to secure by Letters Patent is:

1. A chemical compound selected from the group of compounds represented by the formula:

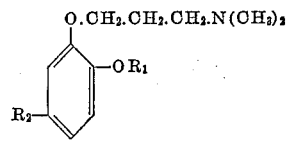

$$O.CH_2.CH_2.CH_2.N(CH_3)_2$$

wherein $R_1$ is a member selected from the group consisting of methyl, ethyl, n-propyl, isopropyl and benzyl radicals; and $R_2$ is an alkenyl radical containing three (3) carbon atoms.

2. The chemical compound, 1-(gamma-dimethylaminopropoxy)-2-methoxy-5-propenylbenzene.

3. The chemical compound, 1-(gamma-dimethylaminopropoxy)-2-ethoxy-5-propenylbenzene.

References Cited in the file of this patent

UNITED STATES PATENTS

| | | |
|---|---|---|
| 1,587,073 | Hahl | June 1, 1926 |
| 1,754,677 | Hahl | Apr. 15, 1930 |
| 2,768,207 | Cheney | Oct. 23, 1956 |

FOREIGN PATENTS

| | | |
|---|---|---|
| 433,182 | Germany | Aug. 20, 1926 |
| 446,606 | Germany | July 7, 1927 |
| 300,695 | Great Britain | Nov. 19, 1928 |
| 510,450 | Germany | Oct. 18, 1930 |
| 563,259 | Germany | Nov. 3, 1932 |
| 153,003 | Switzerland | Jan. 10, 1956 |

OTHER REFERENCES

Khaletskii et al.: Chemical Abstracts, vol. 47: page 8679f (1953) [as abstracted from Zhurnal Obschei Khimii, vol. 22: pages 1648–50 (1952)].

Wright et al.: Journal of the American Chemical Society, vol. 73: page 2282 (1951).

(Copies may be obtained in Pat. Off. Library.)